(12) United States Patent
Kang et al.

(10) Patent No.: US 11,575,976 B2
(45) Date of Patent: Feb. 7, 2023

(54) OMNIDIRECTIONAL VIDEO STREAMING

(71) Applicant: COREDINATE Inc., Suwon-si (KR)

(72) Inventors: Seoyeon Kang, Yongin (KR);
Taekyoung Kim, Seoul (KR)

(73) Assignee: COREDINATE Inc., Suwon-si (KR)

( * ) Notice: Subject to any disclaimer, the term of this patent is extended or adjusted under 35 U.S.C. 154(b) by 0 days.

(21) Appl. No.: 16/764,714

(22) PCT Filed: Aug. 6, 2019

(86) PCT No.: PCT/US2019/045372
§ 371 (c)(1),
(2) Date: May 15, 2020

(87) PCT Pub. No.: WO2020/033455
PCT Pub. Date: Feb. 13, 2020

(65) Prior Publication Data
US 2021/0176537 A1  Jun. 10, 2021

Related U.S. Application Data

(60) Provisional application No. 62/715,760, filed on Aug. 7, 2018.

(51) Int. Cl.
*H04N 19/597* (2014.01)
*H04N 21/437* (2011.01)
*H04N 21/6587* (2011.01)
*H04N 21/81* (2011.01)
*H04N 21/239* (2011.01)
*H04N 21/442* (2011.01)

(52) U.S. Cl.
CPC ......... *H04N 21/816* (2013.01); *H04N 19/597* (2014.11); *H04N 21/2393* (2013.01); *H04N 21/437* (2013.01); *H04N 21/44218* (2013.01); *H04N 21/6587* (2013.01)

(58) Field of Classification Search
CPC ............. H04N 21/816; H04N 21/2393; H04N 21/437; H04N 21/44218; H04N 21/6587; H04N 19/597
USPC .......................................................... 725/10
See application file for complete search history.

(56) References Cited

U.S. PATENT DOCUMENTS

| 10,523,914 B1* | 12/2019 | Phillips | ................ | H04N 19/146 |
| 2016/0078278 A1* | 3/2016 | Moore | ................ | G02B 27/017 |
| | | | | 345/8 |

(Continued)

FOREIGN PATENT DOCUMENTS

| WO | 2017202899 | 11/2017 |
| WO | 2018060347 | 4/2018 |

OTHER PUBLICATIONS

International Application No. PCT/US2019/045372, Search Report and Written Opinion dated Oct. 15, 2019.

*Primary Examiner* — Nathan J Flynn
*Assistant Examiner* — Caroline Somera
(74) *Attorney, Agent, or Firm* — Bridgeway IP Law Group, PLLC; Jihun Kim; Hyun Woo Shin

(57) ABSTRACT

A method and system for streaming video is disclosed. The method and system can include sharing and playing an omnidirectional multi-2D-panel video stream wherein field of view data is obtained from a viewer, and the omnidirectional multi-2D-panel video stream is updated when the field of view data indicates a change in a field of view of the viewer.

19 Claims, 8 Drawing Sheets

(56) References Cited

U.S. PATENT DOCUMENTS

| | | | |
|---|---|---|---|
| 2017/0244884 A1* | 8/2017 | Burtey | G02B 27/017 |
| 2017/0339391 A1 | 11/2017 | Zhou | |
| 2018/0061002 A1 | 3/2018 | Lee | |
| 2018/0146198 A1* | 5/2018 | Atluru | G06V 20/41 |
| 2018/0176468 A1* | 6/2018 | Wang | H04N 19/46 |
| 2018/0176535 A1 | 6/2018 | Ninan | |
| 2018/0352018 A1* | 12/2018 | Mate | H04L 65/601 |
| 2019/0174150 A1* | 6/2019 | D'Acunto | H04N 21/23439 |
| 2020/0037043 A1* | 1/2020 | Phillips | H04N 21/812 |
| 2020/0322403 A1* | 10/2020 | Dvir | H04L 65/611 |

* cited by examiner

OMNIDIRECTIONAL VIDEO STREAMING

CROSS-REFERENCE TO RELATED APPLICATIONS

This application is a national phase application pursuant to 35 U.S.C. § 371 of International Application No. PCT/US2019/045372 filed Aug. 6, 2019, which claims priority to U.S. Provisional Patent Application Ser. No. 62/715,760 filed Aug. 7, 2018, the disclosures of which are hereby incorporated by reference herein.

DETAILED DESCRIPTION

Figure 1:
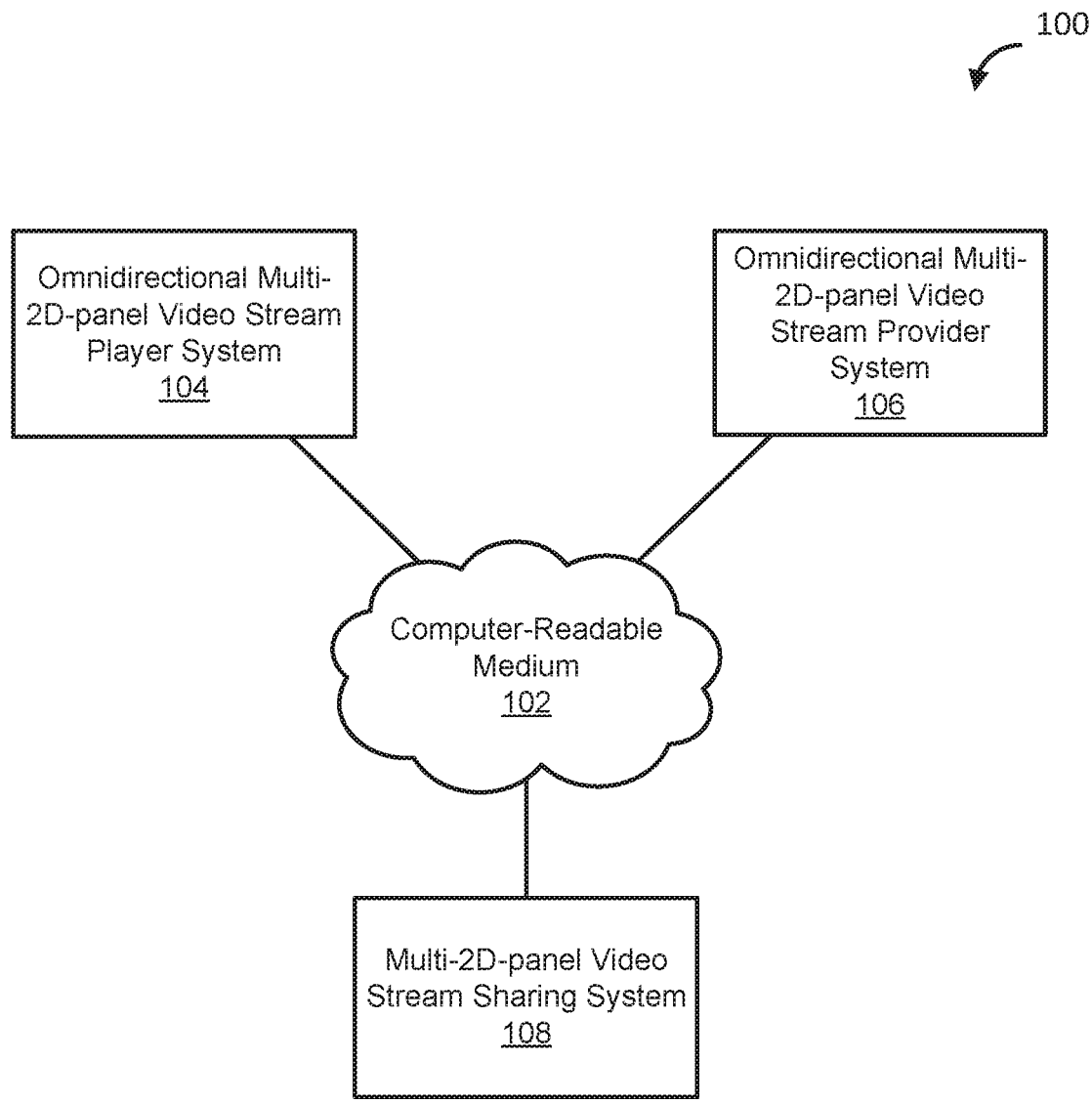
FIG. 1 depicts a diagram of an example of a system for sharing and playing omnidirectional multi-2D-panel video stream.

FIG. 1 depicts a diagram 100 of an example of a system for sharing and playing omnidirectional multi-2D-panel video stream. The example system shown in FIG. 1 includes a computer-readable medium 102, an omnidirectional multi-2D-panel video stream player system 104, an omnidirectional multi-2D-panel video stream provider system 106, and a multi-2D-panel video stream sharing system 108.

In the example of FIG. 1, the omnidirectional multi-2D-panel video stream player system 104, the omnidirectional multi-2D-panel video stream provider system 106, and the multi-2D-panel video stream sharing system 108 are coupled to the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102 and other applicable systems or devices described in this paper can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, Ethernet interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some implementations, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

In the example of FIG. 1, the omnidirectional multi-2D-panel video stream player system 104 is intended to represent a system configured to playback omnidirectional multi-2D-panel video stream in multiple 2D panels. The functionality of the omnidirectional multi-2D-panel video stream player system 104 can be implemented by one or more computing devices (e.g., smartphones, cell phones, smartwatches, tablet computers, laptop computers, and the like) including a display module or other computing devices connectable to a display device. As used in this paper, an omnidirectional multi-2D-panel video stream includes a concurrent streaming of multiple 2D video contents of a scene captured from different angles, so as to substantially cover omnidirectional fields of view (FoV) of the scene. Depending upon implementation-specific or other considerations, multiple FoVs corresponding to the multiple 2D video contents may have partial overlap with each other. "Omnidirectional" as used in this paper may or may not refer to the whole FoVs surrounding a viewing point, which may correspond to a location of an imaging device or eyes of a viewer, and part of the whole FoVs surrounding the viewing point may or may not be available. For example, "omnidirectional" may include a 350-degree angle of view from a viewing point. An example of a specific graphical user interface to present the multi 2D panels of video stream contents is described below with reference to FIG. 8.

In the example of FIG. 1, the omnidirectional multi-2D-panel video stream provider system 106 is intended to represent a system configured to manage omnidirectional multi-2D-panel video stream contents to be distributed to the omnidirectional multi-2D-panel video stream player system 104. The functionality of the omnidirectional multi-2D-panel video stream provider system 106 can be implemented by one or more server computing systems. The server computing systems may be a dedicated computing system for providing services for managing omnidirectional multi- 2D-panel video stream provider system 106, or a distributed computing system provided as an IaaS, PaaS, or SaaS by a third party service provider. In a specific implementation, in managing omnidirectional multi-2D-panel video stream contents, the omnidirectional multi-2D-panel video stream provider system 106 provides user accounts and associated storage space for users of the multi-2D-panel video stream sharing system 108 to upload multi-2D-panel video stream data, and provides a website or a web-based application for viewers to access for playing omnidirectional multi-2D-panel video stream contents. In a specific implementation, in managing omnidirectional multi-2D-panel video stream contents, the omnidirectional multi-2D-panel video stream provider system 106 may also provide applications for users of the multi-2D-panel video stream sharing system 108 to perform video stream setting, and provide applications for users of omnidirectional multi-2D-panel video stream player system 104 to playback omnidirectional multi-2D-panel video stream contents.

In the example of FIG. 1, the multi-2D-panel video stream sharing system 108 is intended to represent a system configured to capture omnidirectional video images, generate multi-2D-panel video stream contents, and upload the multi-2D-panel video stream contents to the omnidirectional multi-2D-panel video stream provider system 106. The functionality of the multi-2D-panel video stream sharing system 108 can be implemented by one or more computing devices (e.g., smartphones, cell phones, smartwatches, tablet computers, laptop computers, desktop computers, and the like) including a camera device or other computing devices connectable to a camera device. In a specific implementation, the camera device is configured to capture omnidirectional video images. For example, 360-degree cameras including one or more lenses and one or more image sensors can be employed for the camera module and/or the camera device.

Figure 2:
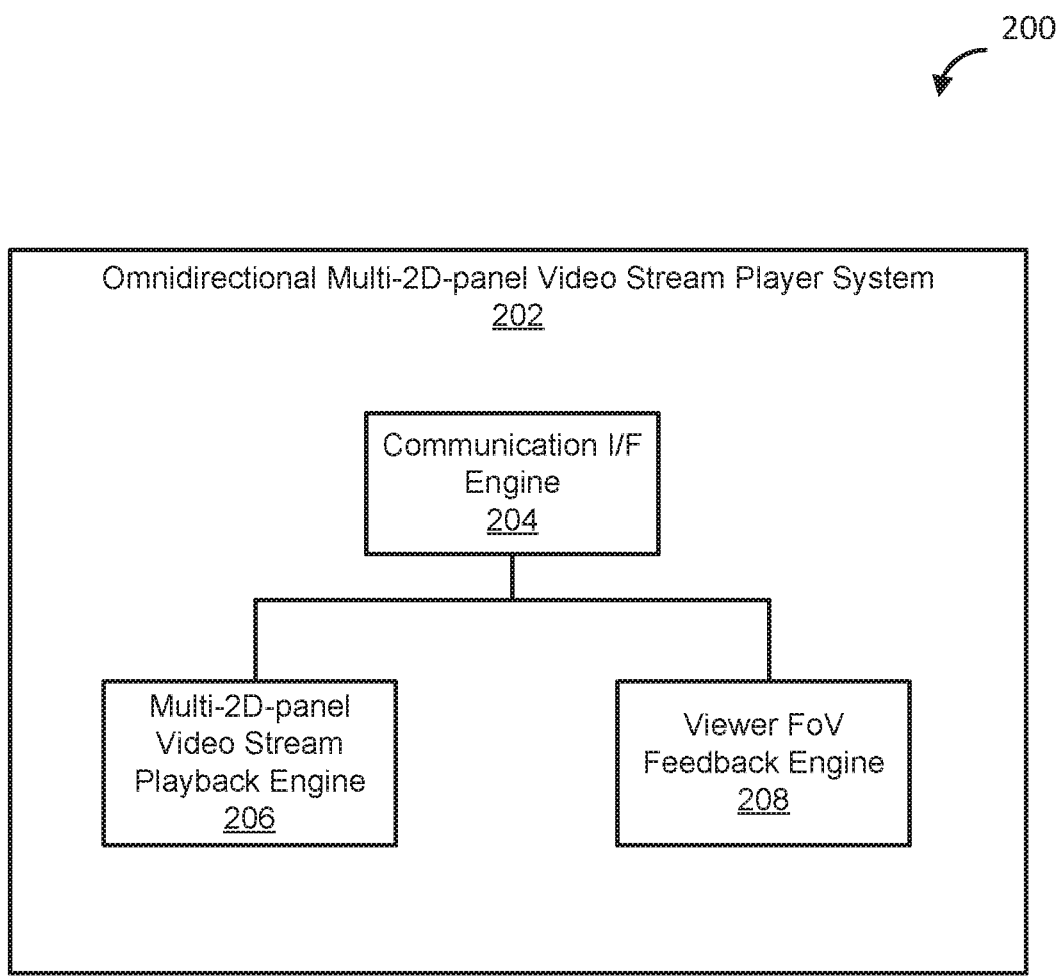
FIG. 2 depicts a diagram of an example of an omnidirectional multi-2D-panel video stream player system.

FIG. 2 depicts a diagram 200 of an example of an omnidirectional multi-2D-panel video stream player system. In the example of FIG. 2, an omnidirectional multi-2D-panel video stream player system 202 includes a communication I/F engine 204, a multi-2D-panel video stream playback engine 206, and a viewer FoV feedback engine 208. In a specific implementation, the omnidirectional multi-2D-panel video stream player system 202 corresponds to the omnidirectional multi-2D-panel video stream player system 104 in FIG. 1.

In the example of FIG. 2, the communication I/F engine 204 is intended to represent hardware configured to communicate with external systems such as an omnidirectional multi-2D-panel video stream provider system and a multi-2D-panel video stream sharing system. In a specific implementation, the communication I/F engine 204 is configured to transmit a request for omnidirectional multi-2D-panel video stream data to an omnidirectional multi-2D-panel video stream provider system, and receive omnidirectional multi-2D-panel video stream data for displaying to one or more viewers. In a specific implementation, the communication I/F engine 204 is configured to send viewer FoV data, which indicates an FoV of a viewer, to an omnidirectional multi-2D-panel video stream provider system, and receive modified omnidirectional multi-2D-panel video stream data from the omnidirectional multi-2D-panel video stream provider system for displaying to one or more viewers. In a specific implementation, the communication I/F engine 204 is configured to receive multi-2D-panel video stream data from a multi-2D-panel video stream sharing system for displaying to one or more viewers.

In the example of FIG. 2, the multi-2D-panel video stream playback engine 206 is intended to represent hardware configured to render the omnidirectional multi-2D-panel video stream data received by the communication I/F engine 204 and present multi 2D panels of video stream contents on a display. An example of a specific graphical user interface to present the multi 2D panels of video stream contents is described below with reference to FIG. 8. Depending upon implementation-specific or other considerations, any applicable display device may be employed for the display for displaying the multi 2D panels of video stream contents. Such display devices may include a smart phone, a tablet, a smart watch, a laptop, a desktop computer, a TV, a monitor, a head-mount display, a gaming device, to name a few.

In the example of FIG. 2, the viewer FoV feedback engine 208 is intended to represent hardware configured to feedback viewer FoV data of a viewer of multi 2D panels of video stream contents to an applicable system such as an omnidirectional multi-2D-panel video stream provider system. In a specific implementation, viewer FoV data includes data based on which a FoV of the viewer can be obtained, such as sensor data and/or data indicating the FoV of the viewer. In a specific implementation, the viewer FoV feedback engine 208 is configured to continuously cause the communication I/F engine 204 to send viewer FoV data including sensor data indicating the FoV of a viewer. In the alternative, the viewer FoV feedback engine 208 is configured to cause the communication I/F engine 204 to send viewer FoV data indicating a shift amount of the FoV upon the shift of the FoV being detected.

Figure 3:
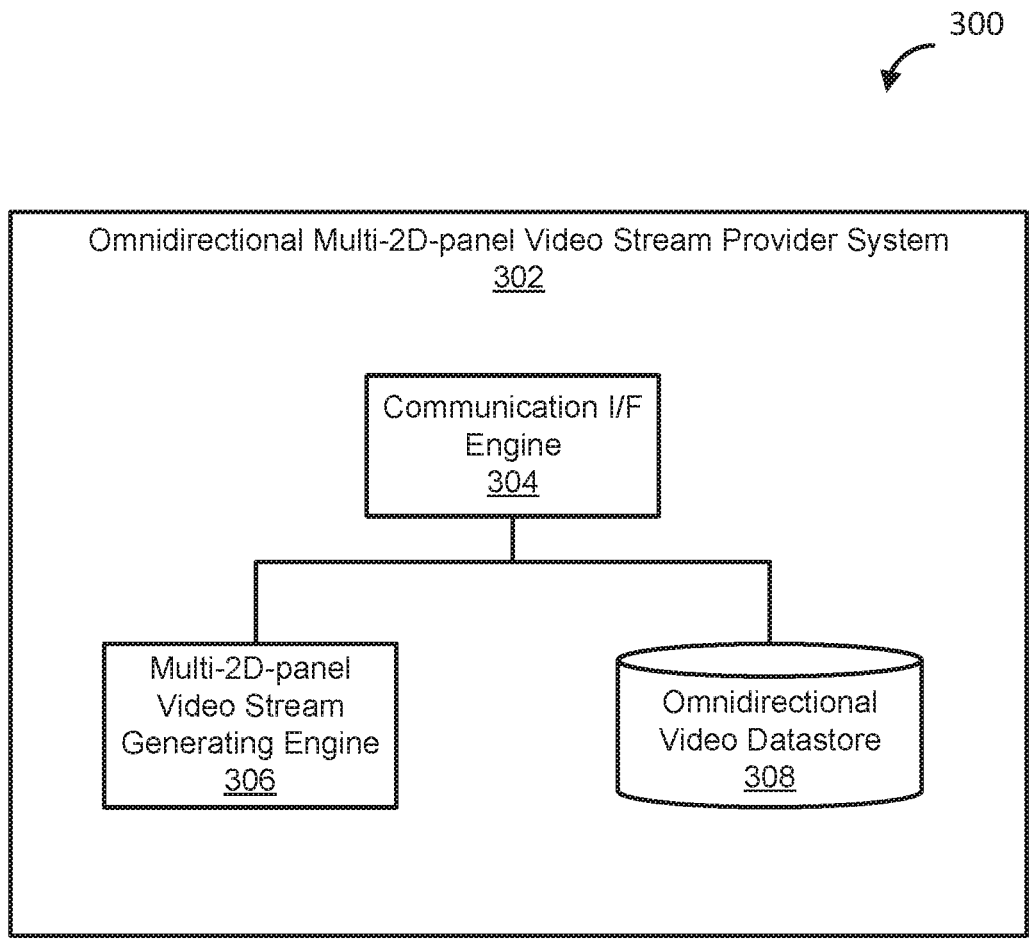
FIG. 3 depicts a diagram of an example of an omnidirectional multi-2D-panel video stream provider system.

FIG. 3 depicts a diagram 300 of an example of an omnidirectional multi-2D-panel video stream provider system. In the example of FIG. 3, an omnidirectional multi-2D-panel video stream provider system 302 includes a communication I/F engine 304, a multi-2D-panel video stream generating engine 306, and an omnidirectional video datastore 308.

In the example of FIG. 3, the communication I/F engine 304 is intended to represent hardware configured to communicate with external systems such as an omnidirectional multi-2D-panel video stream player system and a multi-2D-panel video stream sharing system. In a specific implementation, the communication I/F engine 304 is configured to receive a request for omnidirectional multi-2D-panel video stream data from an omnidirectional multi-2D-panel video stream player system, and send omnidirectional multi-2D-panel video stream data to the omnidirectional multi-2D-panel video stream player system. In a specific implementation, the communication I/F engine 304 is configured to receive viewer FoV data from an omnidirectional multi-2D-panel video stream player system, and send modified omnidirectional multi-2D-panel video stream data to the omnidirectional multi-2D-panel video stream player system. In a specific implementation, the communication I/F engine 304 is configured to receive multi-2D-panel video stream data from a multi-2D-panel video stream sharing system and distribute omnidirectional multi-2D-panel video stream generated based on the multi-2D-panel video stream data.

In the example of FIG. 3, the multi-2D-panel video stream generating engine 306 is intended to represent hardware configured to create omnidirectional multi-2D-panel video stream data. In a specific implementation, in creating the omnidirectional multi-2D-panel video stream data, the multi-2D-panel video stream generating engine 306 retrieves omnidirectional video content data from the omnidirectional video datastore 308 or receives omnidirectional video content data from external systems such as a multi- 2D-panel video stream sharing system. The omnidirectional multi-2D-panel video stream data comprises a stream of video data and causes display of multiple 2D panels for displaying the video contents. An example of a specific graphical user interface to present the multi 2D panels of video stream contents is described below with reference to FIG. 8.

Figure 4:
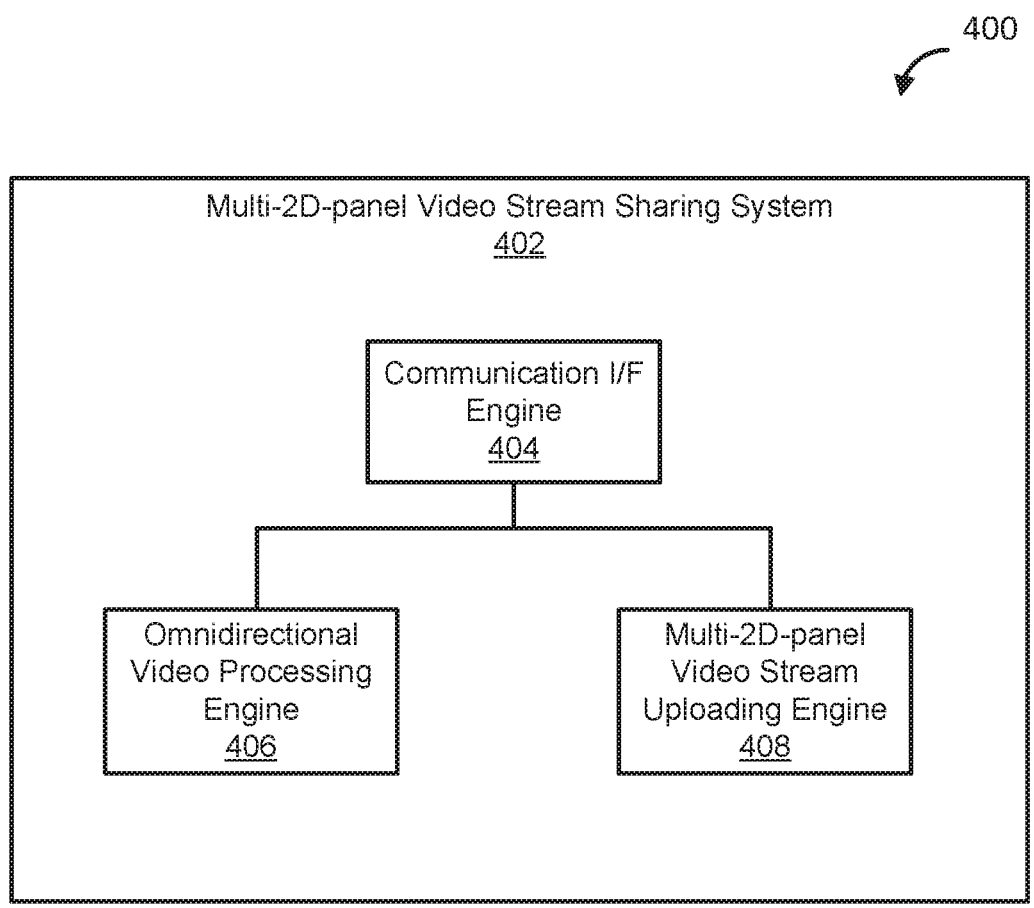
FIG. 4 depicts a diagram of an example of a multi-2D-panel video stream sharing system.

FIG. 4 depicts a diagram 400 of an example of a multi-2D-panel video stream sharing system. In the example of FIG. 4, a multi-2D-panel video stream sharing system 402 includes a communication I/F engine 404, an omnidirectional video processing engine 406, and a multi-2D-panel video stream uploading engine 408.

In the example of FIG. 4, the communication I/F engine 404 is intended to represent hardware configured to communicate with external systems such as an omnidirectional multi-2D-panel video stream provider system and an omnidirectional multi-2D-panel video stream player system. In a specific implementation, the communication I/F engine 404 is configured to transmit multi-2D-panel video stream data to an omnidirectional multi-2D-panel video stream provider system for distributing omnidirectional multi-2D-panel video stream data to viewers. In a specific implementation, the communication I/F engine 404 is configured to transmit multi-2D-panel video stream data to one or more omnidirectional multi-2D-panel video stream player systems without passing through an omnidirectional multi-2D-panel video stream provider system for displaying omnidirectional multi-2D-panel video stream contents on display.

In the example of FIG. 4, the omnidirectional video processing engine 406 is intended to represent hardware configured to generate multi-2D-panel video stream data from omnidirectional video data as a result of capturing images by one or more cameras. In a specific implementation, in generating the multi-2D-panel video stream data, the omnidirectional video processing engine 406 obtains the omnidirectional video data from one or more cameras connected to or integrated with the multi-2D-panel video stream sharing system 402. The one or more cameras may include an omnidirectional camera configured to capture images in omnidirectional angles. In a specific implementation, in generating the multi-2D-panel video stream data, the omnidirectional video processing engine 406 determines a presentation FoV for the omnidirectional video data. The presentation FoV is an FoV of an imaginary presenter in the scene at which images are captured, and may or may not correspond to an FoV of a human or an artificial agent who captures the images at the scene.

Figure 8:
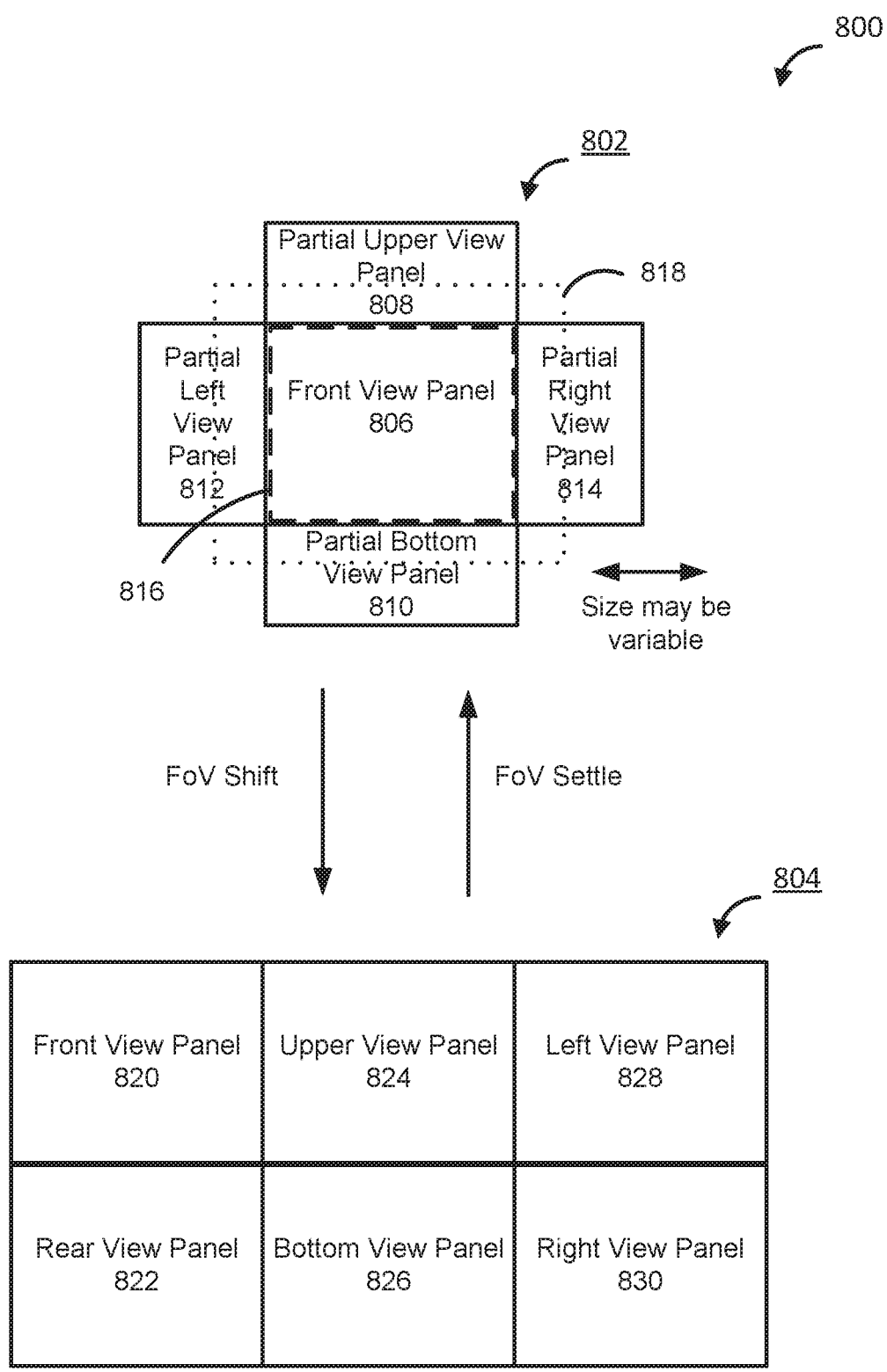
FIG. 8 depicts a diagram of an example of a transition of multi 2D panels for displaying an omnidirectional multi-2D-panel video stream.

In a specific implementation, in generating the multi-2D-panel video stream data, the omnidirectional video processing engine 406 determines multi 2D panels for presenting the captured omnidirectional video data based on the presentation FoV. An example of the multi 2D panels is depicted in FIG. 8. For example, when a 2D panel corresponding to the presentation FoV is determined to be a front view panel to display a front view of the imaginary presenter, peripheral panels such as a rear view panel, an upper view panel, a bottom view panel, a left view panel, and a right view panel are determined based on the determined front view panel to display peripheral views of the imaginary presenter. In a specific implementation, in generating the multi-2D-panel video stream data, the omnidirectional video processing engine 406 generates multi-2D-panel video stream data based on the determined multi 2D panels.

In the example of FIG. 4, the multi-2D-panel video stream uploading engine 408 is intended to represent hardware configured to upload multi-2D-panel video stream data generated by the omnidirectional video processing engine 406. In a specific implementation, in uploading the multi-2D-panel video stream data, the multi-2D-panel video stream uploading engine 408 causes the communication I/F engine 404 to transmit the multi-2D-panel video stream data to an applicable system such as an omnidirectional multi-2D-panel video stream provider system over a network.

Figure 5:
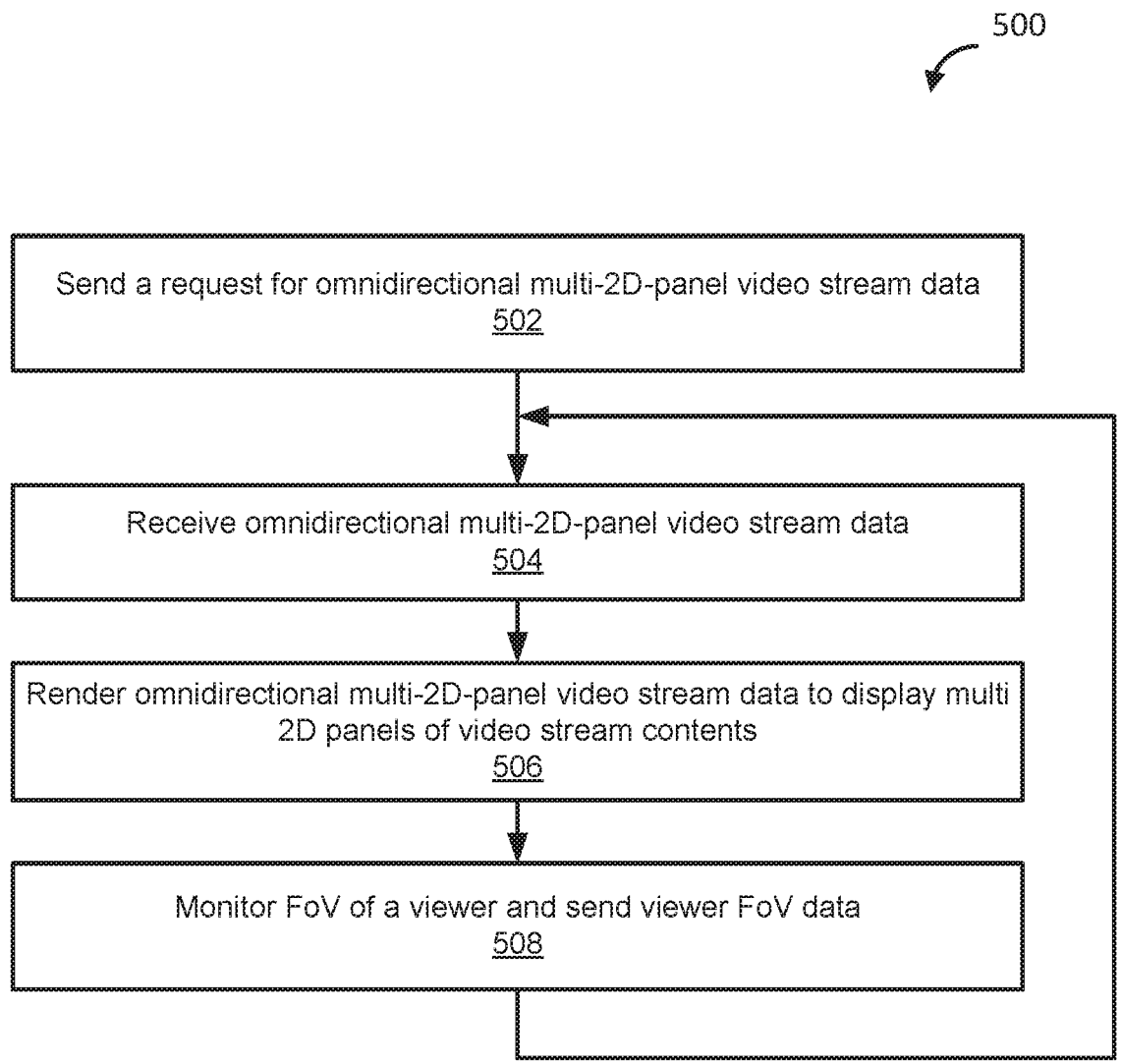
FIG. 5 depicts a flowchart of an example of a method for playing an omnidirectional multi-2D-panel video stream.

FIG. 5 depicts a flowchart 500 of an example of a method for playing an omnidirectional multi-2D-panel video stream. In this and other flowcharts described in this paper, the flowchart illustrates by way of example a sequence of modules. It should be understood the modules can be reorganized for parallel execution, or reordered, as applicable. Moreover, some modules that could have been included may have been removed for the sake of clarity and some modules that were included could be removed, but may have been included for the sake of illustrative clarity. In a specific implementation, the modules of the flowchart 500 are carried out by one or more applicable engines of an omnidirectional multi-2D-panel video stream player system, and may or may not be performed in response to inputs by human or artificial agents.

In the example of FIG. 5, the flowchart 500 starts at module 502 with sending a request for omnidirectional multi-2D-panel video stream data. In a specific implementation, an applicable engine of an omnidirectional multi-2D-panel video stream player system, such as a communication interface engine thereof, sends the request for omnidirectional multi-2D-panel video stream data to an applicable engine of an omnidirectional multi-2D-panel video stream provider system, such as a communication interface engine thereof. In a specific implementation, the request for omnidirectional multi-2D-panel video stream data is generated upon a user selection of a corresponding object in a list or a menu of omnidirectional multi-2D-panel video stream contents provided through a user interface generated based on web contents. For example, a user selection of a video content title in the list of video contents in a webpage generates the request for omnidirectional multi-2D-panel video stream data.

In the example of FIG. 5, the flowchart 500 continues to module 504 with receiving omnidirectional multi-2D-panel video stream data. In a specific implementation, an applicable engine of an omnidirectional multi-2D-panel video stream player system, such as a communication interface engine thereof receives the omnidirectional multi-2D-panel video stream data from an applicable engine of an omnidirectional multi-2D-panel video stream provider system, such as a communication interface engine thereof. The omnidirectional multi-2D-panel video stream data comprises a stream of video data transmitted through a computer network, and the module 504 is intended to represent a process to receive video content data corresponding to at least a fragmented portion of an entire duration of omnidirectional multi-2D-panel video contents. The stream of video data further comprises video data to be presented on a plurality of 2D display panels synchronously.

In the example of FIG. 5, the flowchart 500 continues to module 506 with rendering omnidirectional multi-2D-panel video stream data to display multiple 2D panels of video stream contents. In a specific implementation, an applicable engine of an omnidirectional multi-2D-panel video stream player system, such as a multi-2D-panel video stream playback engine thereof renders the omnidirectional multi-2D-panel video stream data to display the multi 2D panels of video stream contents. In a specific implementation, the omnidirectional multi-2D-panel video stream data is compressed using an applicable video codec for transmission through network, and decompression of the omnidirectional multi-2D-panel video stream data is carried out for rendering. In a specific implementation, the omnidirectional multi-2D-panel video stream data is rendered, such that 2D-panel video stream displayed on multiple 2D panels are synchronized in time. For example, 2D-panel video stream displayed on multiple 2D panels includes 2D-panel video stream of a front view, an upper view, a bottom view, a left view and a right view displayed synchronously to each other, and may or may not further includes 2D-panel video stream of a rear view displayed synchronously to the other view angles.

In the example of FIG. 5, the flowchart 500 continues to module 508 with monitoring an FoV of a viewer and sending viewer FoV data. In a specific implementation, an applicable engine of an omnidirectional multi-2D-panel video stream player system, such as a viewer FoV feedback engine thereof monitors an FoV of a viewer and operates to send viewer FoV data of the viewer. In a specific implementation, an FoV of a viewer is monitored based on sensor data obtained by one or more sensors configured to track eye or head movement of the viewer. Depending upon implementation-specific or other considerations, the one or more sensors may include a camera directed to capture eye or head movement of the viewer and/or an acceleration and gyro sensor attached to a body portion of the viewer (e.g., within a head-mount device). In a specific implementation, the viewer FoV data includes data based on which an FoV of the viewer can be obtained, such as the sensor data, instead of data indicating the FoV of the viewer. In a specific implementation, the viewer FoV data includes the data indicating the FoV of the viewer. In a specific implementation, the viewer FoV data may include data indicating an actual current FoV of the viewer and/or predicted future FoV of the viewer. In a specific implementation, the viewer FoV data may be selectively sent when the FoV of the viewer has changed and/or is predicted to change, instead of being regularly sent. After the module 508, the flowchart 500 returns to the module 504 and repeats the modules 504-508 until the playback of the omnidirectional multi-2D-panel video stream data ends.

Figure 6:
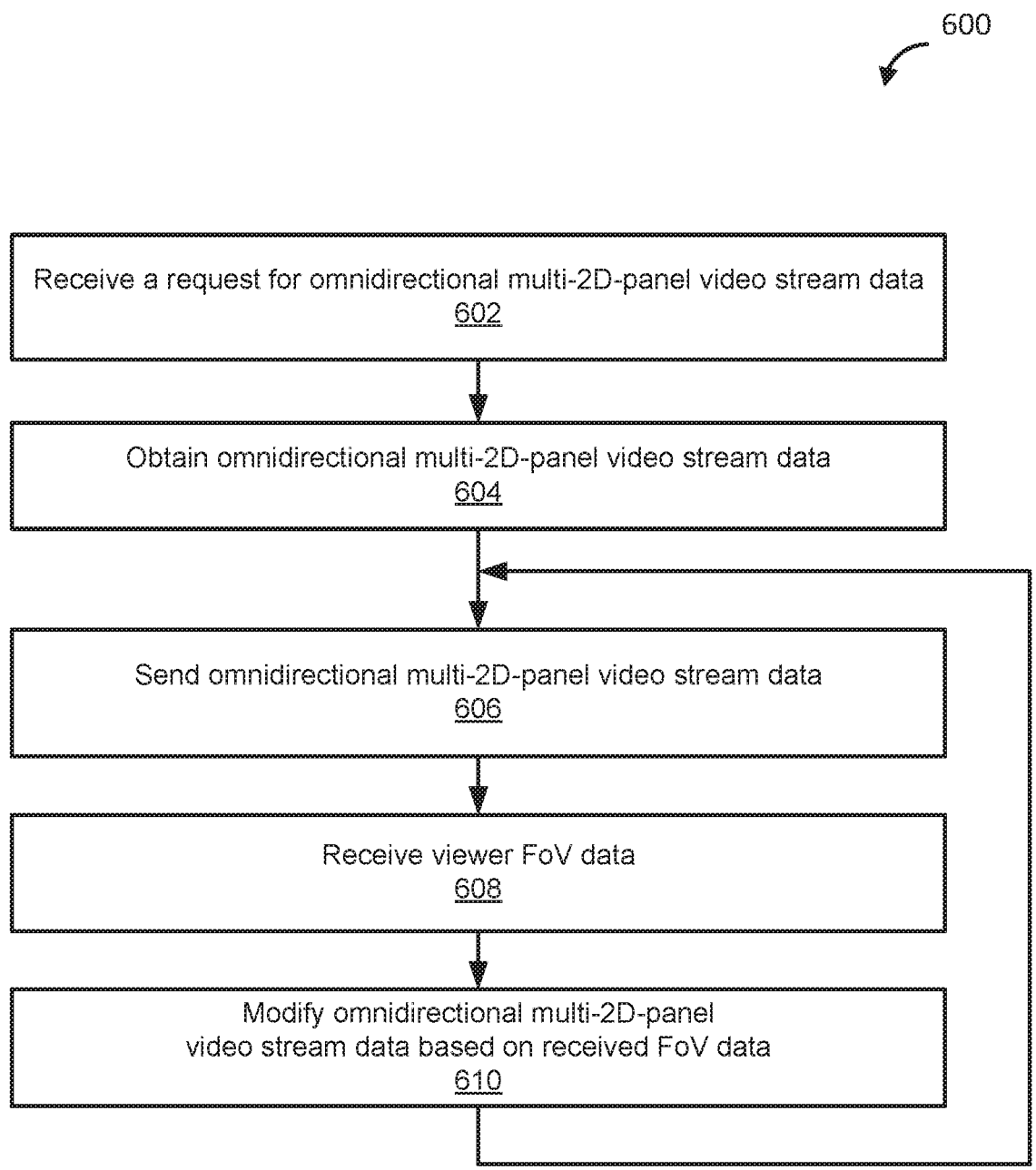
FIG. 6 depicts a flowchart of an example of a method for providing omnidirectional multi-2D-panel video stream data.

FIG. 6 depicts a flowchart 600 of an example of a method for providing omnidirectional multi-2D-panel video stream data. In a specific implementation, the modules of the flow chart 600 are carried out by one or more applicable engines of an omnidirectional multi-2D-panel video stream provider system, and may or may not performed in response to inputs by human or artificial agents. In the example of FIG. 6, the flowchart 600 starts at module 602 with receiving a request for omnidirectional multi-2D-panel video stream data. In a specific implementation, an applicable engine of an omnidirectional multi-2D-panel video stream provider system, such as a communication interface engine thereof, receives the request for omnidirectional multi-2D-panel video stream data from an applicable engine of an omnidirectional multi-2D-panel video stream player system, such as a communication interface engine thereof.

In the example of FIG. 6, the flowchart 600 continues to module 604 with obtaining omnidirectional multi-2D-panel video stream data. In a specific implementation, the omnidirectional multi-2D-panel video stream data is received from an applicable system such as a multi-2D-panel video stream sharing system, through a network. In a specific implementation, the omnidirectional multi-2D-panel video stream data is generated by an applicable engine such as a multi-2D-panel video stream generating engine using omnidirectional video data stored in an applicable datastore such as omnidirectional video datastore. In a specific implementation, the omnidirectional multi-2D-panel video stream data is compressed using an applicable video codec for transmission through a network.

In the example of FIG. 6, the flowchart 600 continues to module 606 with sending omnidirectional multi-2D-panel video stream data. In a specific implementation, the omnidirectional multi-2D-panel video stream data is provided to the applicable engine of the omnidirectional multi-2D-panel video stream player system, such as the communication interface engine thereof, from which the request for omnidirectional multi-2D-panel video stream data has been received.

In the example of FIG. 6, the flowchart 600 continues to module 608 with receiving viewer FoV data. In a specific implementation, the viewer FoV data contain the same or similar information as the viewer FoV data sent from a multi-2D-panel video stream player system, such as the system in module 508 in FIG. 5.

In the example of FIG. 6, the flowchart 600 continues to module 610 with modifying omnidirectional multi-2D-panel video stream data based on received FoV data. In a specific implementation, when it is determined that an FoV of a viewer has shifted or is going to shift from a current FoV, which corresponds to a front view, to a new FoV, omnidirectional multi-2D-panel video stream data is modified such that the new FoV corresponds to the front view. For example, when an FoV of a viewer is shifting from the front view to a left view, the left view is changed to a new front view, and the current front view is changed to a new right view. Similarly, multi-2D-panel video stream data of other view angles of the viewer are modified. The modified omnidirectional multi-2D-panel video stream data are transmitted to the omnidirectional multi-2D-panel video stream player system associated with the viewer, such that the multi-2D-panel video stream of the new FoV is presented to the viewer.

Figure 7:
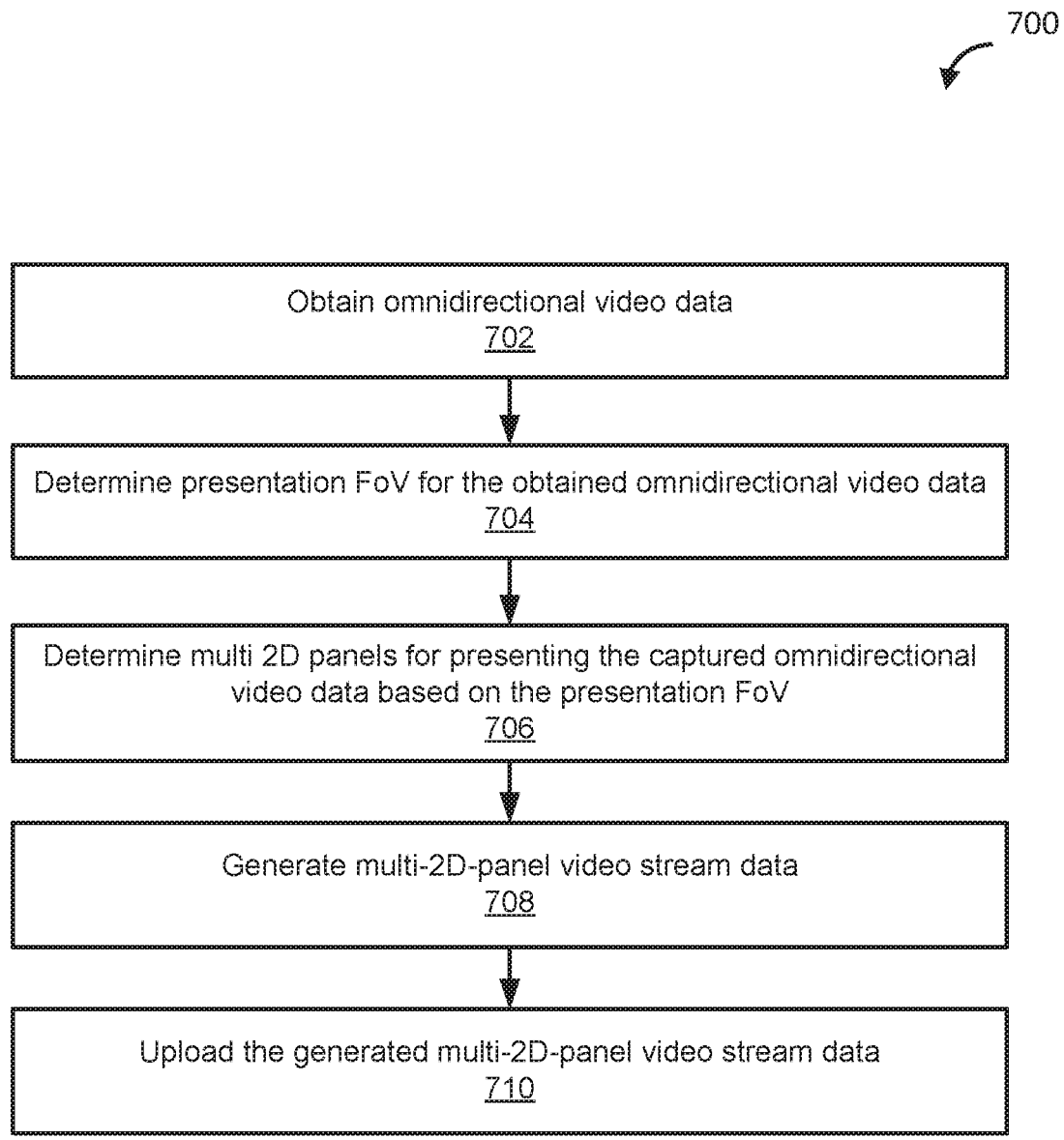
FIG. 7 depicts a flowchart of an example of a method for sharing multi-2D-panel video stream data.

FIG. 7 depicts a flowchart 700 of an example of a method for sharing multi-2D-panel video stream data. In a specific implementation, the modules of the flow chart 700 are carried out by one or more applicable engines of an omnidirectional multi-2D-panel video stream sharing system, and may or may not performed in response to inputs by human or artificial agents. In a specific implementation, at least some of the modules of the flow chart 700 are carried out by one or more applicable engines of an omnidirectional multi-2D-panel video stream provider system, and may or may not performed in response to inputs by human or artificial agents. In the example of FIG. 7, the flowchart 700 starts at module 702 with obtaining omnidirectional video data. In a specific implementation, an applicable engine of an omnidirectional multi-2D-panel video stream sharing system, such as an omnidirectional video processing engine thereof, obtains the omnidirectional video data. In a specific implementation, the omnidirectional video data may be generated by capturing omnidirectional images using an omnidirectional camera or other suitable devices and sent to the applicable engine of an omnidirectional multi-2D-panel video stream sharing system.

In the example of FIG. 7, the flowchart 700 continues to module 704 with determining presentation FoV for the obtained omnidirectional video data. In a specific implementation, an applicable engine of an omnidirectional multi-2D-panel video stream sharing system, such as an omnidirectional video processing engine thereof, determines the presentation FoV for the obtained omnidirectional video data. The presentation FoV is determined based on various applicable criteria. For example, when a camera to capture omnidirectional video images is mounted on a vehicle (e.g., car, bike, bicycle, drone, etc.), the FoV is determined to be a region corresponding to a travelling direction of the vehicle. In another example, when a camera to capture omnidirectional video images is attached to a human or an animal, the FoV is determined to be a region corresponding to a viewing direction (e.g., eye or head direction) of the human or animal. In another example, when a camera to capture omnidirectional video images is used to capture multiple photographic subjects, the FoV is determined to be a view angle corresponding to a selected one of the multiple photographic subjects. Depending upon implementation-specific or other considerations, selection of the one of the multiple photographic subjects may be made based on operation of a switch or other applicable devices by the selected one of the multiple photographic subjects or other operators.

In the example of FIG. 7, the flowchart 700 continues to module 706 with determining multi 2D panels for presenting the captured omnidirectional video data based on the presentation FoV. In a specific implementation, an applicable engine of an omnidirectional multi-2D-panel video stream sharing system, such as an omnidirectional video processing engine thereof, determines the multi 2D panels for presenting the captured omnidirectional video data. In a specific implementation, the multi 2D panels include a front view corresponding to the determined presentation FoV, and one or more images of other view angles. For example, multi 2D panels include a front view panel, a top view panel, a bottom view panel, a left view panel, and a right view panel.

In the example of FIG. 7, the flowchart 700 continues to module 708 with generating multi-2D-panel video stream data. In a specific implementation, an applicable engine of an omnidirectional multi-2D-panel video stream sharing system, such as an omnidirectional video processing engine thereof, generates the multi-2D-panel video stream data. In a specific implementation, the omnidirectional multi-2D-panel video stream data is compressed using an applicable video codec for transmission through a network.

In the example of FIG. 7, the flowchart 700 continues to module 710 with uploading the generated multi-2D-panel video stream data. In a specific implementation, an applicable engine of an omnidirectional multi-2D-panel video stream sharing system, such as a multi-2D-panel video stream uploading engine thereof, uploads the generated multi-2D-panel video stream data. Depending upon implementation-specific or other considerations, the generated multi-2D-panel video stream data may be uploaded to an omnidirectional multi-2D-panel video stream provider system for distribution to viewers and/or directly to one or more omnidirectional multi-2D-panel video stream player systems.

FIG. 8 depicts a diagram 800 of an example of a transition of multi 2D panels for displaying an omnidirectional multi-2D-panel video stream. The diagram 800 includes a first multi-2D-panel interface 802 and a second multi-2D-panel interface 804. In a specific implementation, a shift or potential shift of an FoV of a viewer causes transition between the first multi-2D-panel interface 802 and the second multi-2D-panel interface 804.

In the example of FIG. 8, the first multi-2D-panel interface 802 is intended to represent a graphical user interface presented on a display viewed by a viewer of an omnidirectional multi-2D-panel video stream when an FoV of the viewer is settled. The first multi-2D-panel interface 802 includes a front view panel 806, a partial upper view panel 808, a partial bottom view panel 810, a partial left view panel 812, and a partial right view panel 814. In a specific implementation, the front view panel 806 displays 2D video stream corresponding to the FoV 816 of the viewer, and the front view panel 806 is set to substantially overlap with the FoV 816 of the viewer. Depending upon implementation-specific or other considerations, the FoV 816 of the viewer may or may not have the same area as the front view panel 806, and the FoV 816 of the viewer may be larger or smaller than the front view panel 806. Depending upon implementation-specific or other considerations, an aspect ratio of the FoV 816 may or may not be the same as that of the front view panel 806 (e.g., 16:9, 4:3, etc.). The FoV 816 of the viewer may be obtained from applicable sensors to track an FoV of the viewer.

In a specific implementation, the partial upper view panel 808, the partial bottom view panel 810, the partial left view panel 812, and the partial right view panel 814 (hereinafter collectively referred to as "peripheral view panels") display 2D video stream corresponding to an upper side, a bottom side, a left side, and a right side of the FoV 816 of the viewer, respectively. Depending upon implementation-specific or other considerations, video images displayed in the peripheral view panels may or may not be displayed seamlessly with video images displayed in the front view panel 806. In a specific implementation, the peripheral view panels are "partial" in that the panel size thereof is smaller (e.g., ½-¼) than that of the front view panel 806. Depending upon implementation-specific or other considerations, the panel sizes of the peripheral view panels may be different from each other.

According to a specific implementation, the omnidirectional multi-2D-panel video stream data corresponding to the display portion are selectively received through a network for shorter latency of data communication and displayed on the first multi-2D-panel interface 802 for faster video rendering process. That is, the omnidirectional multi-2D-panel video stream data communicated over the network does not include video stream data of the entire view angles of the viewer.

In a specific implementation, the panel size of one or more of the peripheral view panels, in particular, a width in a direction perpendicular to an adjacent edge of the front view panel 806, is variable depending on latency for displaying the multi-2D-panel video stream. For example, the panel size of one or more of the peripheral view panels may increase and/or decrease as a processing power (e.g., the number of cores, clock frequency, RAM size, etc.) of the video stream data increases and/or decreases. In another example, the panel size of one or more of the peripheral view panels may increase as data communication speed for the video stream data increases and/or decreases. Depending upon implementation-specific or other considerations, resolution of the panels in the first multi-2D-panel interface 802 may or may not be the same.

In a specific implementation, if the FoV 816 of the viewer at least partially exits out of an FoV shift boundary 818, it is determined that the FoV 816 of the viewer has shifted, and transition to the second multi-2D-panel interface 804 is carried out. Depending upon implementation-specific or other considerations, the FoV shift boundary 818 may or may not cover the entire regions of the peripheral view panels, and may or may not be the same as the area of the front view panel 806.

In the example of FIG. 8, the second multi-2D-panel interface 804 is intended to represent a graphical user interface presented on a display viewed by a viewer of an omnidirectional multi-2D-panel video stream when an FoV of the viewer is determined to have shifted. The second multi-2D-panel interface 804 includes a front view panel 820, a rear view panel 822, an upper view panel 824, a bottom view panel 826, a left view panel 828, and a right view panel 830.

In a specific implementation, the front view panel 820 displays 2D video stream corresponding to the FoV (previous or shifted FoV) of the viewer or the front view panel 806 of the first multi-2D-panel interface 802. The rear view panel 822, the upper view panel 824, the bottom view panel 826, the left view panel 828, and the right view panel 830 (hereinafter collectively referred to as "peripheral view panels") display 2D video stream corresponding to a rear side, an upper side, a bottom side, a left side, and a right side of the FoV of the viewer, respectively. In a specific implementation, the peripheral view panels have the same size as that of the front view panel 820, and therefore may display the entire region of the corresponding view angle. Depending upon implementation-specific or other considerations, an arrangement of the front view panel 820 and the peripheral view panels in the second multi-2D-panel interface 804 may be different from that depicted in FIG. 8 and/or may be variable depending on setting. For example, the front view panel 820 may be located at the center of the second multi-2D-panel interface 804, and the arrangement may be two columns by three rows instead of three columns by two rows as depicted.

In a specific implementation, depending on latency for displaying the second multi-2D-panel interface 804, resolution of the panels in the second multi-2D-panel interface 804 may be adjusted. For example, when bandwidth for streaming the omnidirectional multi-2D-panel video is insufficient, the resolution of one or more of the panels in the second multi-2D-panel interface 804 may be reduced from the resolution of the panels in the first multi-2D-panel interface 802. In this case, the resolutions of the panels in the second multi-2D-panel interface 804 may or may not be different. For example, a resolution of the front view panel 820 may be lower than that of the peripheral view panels. In another example, a resolution of a peripheral view panel to which the FoV of the viewer is shifting may be higher than resolutions of one or more of the other view panels of the second multi-2D-panel interface 804. In still another example, the resolution of the front view panel 820 and the peripheral view panel to which the FoV of the viewer is shifting may be higher than resolutions of the other view panels of the second multi-2D-panel interface 804.

In a specific implementation, when it is determined that an FoV of the viewer is settled, transition to the first multi-2D-panel interface 802 is carried out. Depending upon implementation-specific or other considerations, various applicable events can be a trigger of the transition. For example, the FoV of the viewer fixed to a specific one of the panels of the second multi-2D-panel interface 804 at a predetermined period of time may be a trigger of the transition. In another example, a user selection of one of the panels of the second multi-2D-panel interface 804 using any applicable controller may be a trigger of the transition.

For purposes of explanation, numerous specific details are set forth in order to provide a thorough understanding of the description. It will be apparent, however, to one skilled in the art that implementations of the disclosure can be practiced without these specific details. In some instances, systems, modules, engines, structures, processes, features, and devices are shown in block diagram form in order to avoid obscuring the description. In other instances, functional block diagrams and flow diagrams are shown to represent data and logic flows. The components of block diagrams and flow diagrams (e.g., steps, modules, blocks, structures, devices, features, etc.) may be variously combined, separated, removed, reordered, and replaced in a manner other than as expressly described and depicted herein.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the implementations is intended to be illustrative, but not limiting, of the scope, which is set forth in the claims recited herein. The techniques described in the preceding text and figures can be mixed and matched as circumstances demand to produce alternative implementations.

The invention claimed is:

1. A method comprising:
rendering, by an omnidirectional multi-2D-panel video stream player system including a multi-2D graphical user interface, omnidirectional multi-2D-panel video stream data comprising first 2D-panel video stream data, second 2D-panel video stream data, third 2D-panel video stream data, fourth 2D-panel video stream data, and fifth 2D-panel video stream data, wherein the multi-2D graphical user interface includes a front view panel corresponding to a front portion of a field of view (FoV) of a viewer, a partial upper view panel corresponding to an upper portion of the FoV, a partial bottom view panel corresponding to a bottom portion of the FoV, a partial left view panel corresponding to a left portion of the FoV, and a partial right view panel corresponding to a right portion of the FoV;

synchronously presenting, by the omnidirectional multi-2D-panel video stream player system, the omnidirectional multi-2D-panel video stream data on a display, the synchronous presentation including synchronously presenting the first 2D-panel video stream data via the front view panel of the multi-2D graphical user interface, the second 2D-panel video stream data via the partial bottom view panel of the multi-2D graphical user interface, the third 2D-panel video stream data via the partial upper view panel of the multi-2D graphical user interface, the fourth 2D-panel video stream data via the partial left view panel of the multi-2D graphical user interface, and the fifth 2D-panel video stream data via the partial right view panel of the multi-2D graphical user interface;

detecting a change in processing power of the omnidirectional multi-2D-panel video stream player system;

adjusting, in response to detecting the change in processing power of the omnidirectional multi-2D-panel video stream player system, a first width of the partial left view panel in a first direction perpendicular to a first adjacent edge of the front view panel;

adjusting, in response to detecting the change in the processing power of the omnidirectional multi-2D-panel video stream player system, a second width of the partial right view panel in a second direction perpendicular to a second adjacent edge of the front view panel;

obtaining, by the omnidirectional multi-2D-panel video stream player system, field of view (FoV) data of the viewer;
sending, by the omnidirectional multi-2D-panel video stream player system to an omnidirectional multi-2D-panel video stream provider system, the FoV data of the viewer;
predicting, by the omnidirectional multi-2D-panel video stream provider system, a change of the FoV of the viewer;
receiving, by the omnidirectional multi-2D-panel video stream player system from the omnidirectional multi-2D-panel video stream provider system in response to predicting the change of the FoV of the viewer, modified omnidirectional multi-2D-panel video stream data the modified omnidirectional multi-2D-panel video stream data including a predicted future FoV of the viewer;
rendering, by the omnidirectional multi-2D-panel video stream player system, the modified omnidirectional multi-2D-panel video stream data;
presenting, by the omnidirectional multi-2D-panel video stream player system, the modified omnidirectional multi-2D-panel video stream data on the display.

2. The method of claim 1, further comprising:
compressing, by the omnidirectional multi-2D-panel video stream provider system, the omnidirectional multi-2D panel video stream data a video codec;
decompressing, by the omnidirectional multi-2D-panel video stream player system, the compressed omnidirectional multi-2D panel video stream data before rendering the omnidirectional multi-2D panel video stream data.

3. The method of claim 1, further comprising:
receiving, by the omnidirectional multi-2D-panel video stream provider system from the omnidirectional multi-2D-panel video stream player system, a request for omnidirectional multi-2D-panel video stream data;
sending, by the omnidirectional multi-2D-panel video stream provider system to the omnidirectional multi-2D-panel video stream player system, the omnidirectional multi-2D-panel video stream data.

4. The method of claim 1, further comprising modifying, by the omnidirectional multi-2D-panel video stream provider system, the omnidirectional multi-2D-panel video stream data based on the FoV data of the viewer.

5. The method of claim 1, wherein the FoV data is obtained by one or more sensors configured to track eye or head movement of the viewer, the one or more sensors including one or more cameras.

6. The method of claim 1, wherein the FoV data is obtained by one or more sensors configured to track eye or head movement of the viewer, the one or more sensors including one or more acceleration and gyro sensors attached to a body portion of the viewer.

7. The method of claim 1, wherein the FoV data is obtained by one or more sensors configured to track eye or head movement of the viewer, the one or more sensors including one or more acceleration and gyro sensors located in a head-mount device worn by the viewer.

8. The method of claim 1, wherein the FoV data include data indicating a current FoV or predicted future FoV of the viewer.

9. The method of claim 1, wherein the receiving the FoV data comprises receiving the FoV data continuously.

10. A data processing system comprising a processor adapted to perform:
rendering, by an omnidirectional multi-2D-panel video stream player system including a multi-2D graphical user interface, omnidirectional multi-2D-panel video stream data comprising first 2D-panel video stream data, second 2D-panel video stream data, third 2D-panel video stream data, fourth 2D-panel video stream data, and fifth 2D-panel video stream data, wherein the multi-2D graphical user interface includes a front view panel corresponding to a front portion of a field of view (FoV) of a viewer, a partial upper view panel corresponding to an upper portion of the FoV, a partial bottom view panel corresponding to a bottom portion of the FoV, a partial left view panel corresponding to a left portion of the FoV, and a partial right view panel corresponding to a right portion of the FoV;
synchronously presenting, by the omnidirectional multi-2D-panel video stream player system, the omnidirectional multi-2D-panel video stream data on a display, the synchronous presentation including synchronously presenting the first 2D-panel video stream data via the front view panel of the multi-2D graphical user interface, the second 2D-panel video stream data via the partial bottom view panel of the multi-2D graphical user interface, the third 2D-panel video stream data via the partial upper view panel of the multi-2D graphical user interface, the fourth 2D-panel video stream data via the partial left view panel of the multi-2D graphical user interface, and the fifth 2D-panel video stream data via the partial right view panel of the multi-2D graphical user interface;
detecting a change in processing power of the omnidirectional multi-2D-panel video stream player system;
adjusting, in response to detecting the change in processing power of the omnidirectional multi-2D-panel video stream player system, a first width of the partial left view panel in a first direction perpendicular to a first adjacent edge of the front view panel;
adjusting, in response to detecting the change in the processing power of the omnidirectional multi-2D-panel video stream player system, a second width of the partial right view panel in a second direction perpendicular to a second adjacent edge of the front view panel;
obtaining, by the omnidirectional multi-2D-panel video stream player system, field of view (FoV) data of the viewer;
sending, by the omnidirectional multi-2D-panel video stream player system to an omnidirectional multi-2D-panel video stream provider system, the FoV data of the viewer;
predicting, by the omnidirectional multi-2D-panel video stream provider system, a change of the FoV of the viewer;
receiving, by the omnidirectional multi-2D-panel video stream player system from the omnidirectional multi-2D-panel video stream provider system in response to predicting the change of the FoV of the viewer, modified omnidirectional multi-2D-panel video stream data the modified omnidirectional multi-2D-panel video stream data including a predicted future FoV of the viewer;
rendering, by the omnidirectional multi-2D-panel video stream player system, the modified omnidirectional multi-2D-panel video stream data;
presenting, by the omnidirectional multi-2D-panel video stream player system, the modified omnidirectional multi-2D-panel video stream data on the display.

11. The data processing system of claim 10, wherein the processor is adapted to perform:
   compressing, by the omnidirectional multi-2D-panel video stream provider system, the omnidirectional multi-2D panel video stream data a video codec;
   decompressing, by the omnidirectional multi-2D-panel video stream player system, the compressed omnidirectional multi-2D panel video stream data before rendering the omnidirectional multi-2D panel video stream data.

12. The data processing system of claim 10, wherein the processor is adapted to perform:
   receiving, by the omnidirectional multi-2D-panel video stream provider system from the omnidirectional multi-2D-panel video stream player system, a request for omnidirectional multi-2D-panel video stream data;
   sending, by the omnidirectional multi-2D-panel video stream provider system to the omnidirectional multi-2D-panel video stream player system, the omnidirectional multi-2D-panel video stream data.

13. The data processing system of claim 10, wherein the processor is adapted to perform: modifying, by the omnidirectional multi-2D-panel video stream provider system, the omnidirectional multi-2D-panel video stream data based on the FoV data of the viewer.

14. The data processing system of claim 10, wherein the FoV data is obtained by one or more sensors configured to track eye or head movement of the viewer, the one or more sensors including one or more cameras.

15. The data processing system of claim 10, wherein the FoV data is obtained by one or more sensors configured to track eye or head movement of the viewer, the one or more sensors including one or more acceleration and gyro sensors attached to a body portion of the viewer.

16. The data processing system of claim 10, wherein the FoV data is obtained by one or more sensors configured to track eye or head movement of the viewer, the one or more sensors including one or more acceleration and gyro sensors located in a head-mount device worn by the viewer.

17. The data processing system of claim 10, wherein the receiving the FoV data comprises receiving the FoV data continuously.

18. The data processing system of claim 10, wherein the receiving the FoV data comprises receiving the FoV data when an FoV of the viewer has changed or is predicted to change.

19. A system comprising:
   a means for rendering omnidirectional multi-2D-panel video stream data comprising first 2D-panel video stream data, second 2D-panel video stream data, third 2D-panel video stream data, fourth 2D-panel video stream data, and fifth 2D-panel video stream data;
   a means for synchronously presenting the omnidirectional multi-2D-panel video stream data on a display, the synchronous presentation including synchronously presenting the first 2D-panel video stream data via a front view panel of a multi-2D graphical user interface, the second 2D-panel video stream data via a partial bottom view panel of the multi-2D graphical user interface, the third 2D-panel video stream data via a partial upper view panel of the multi-2D graphical user interface, the fourth 2D-panel video stream data via a partial left view panel of the multi-2D graphical user interface, and the fifth 2D-panel video stream data via a partial right view panel of the multi-2D graphical user interface;
   a means for detecting a change in processing power of the omnidirectional multi-2D-panel video stream player system;
   a means for adjusting, in response to detecting the change in processing power of the omnidirectional multi-2D-panel video stream player system, a first width of the partial left view panel in a first direction perpendicular to a first adjacent edge of the front view panel;
   a means for adjusting, in response to detecting the change in the processing power of the omnidirectional multi-2D-panel video stream player system, a second width of the partial right view panel in a second direction perpendicular to a second adjacent edge of the front view panel;
   a means for obtaining field of view (FoV) data of a viewer;
   a means for sending to an omnidirectional multi-2D-panel video stream provider system the FoV data of the viewer;
   a means for predicting a change of the FoV of the viewer;
   a means for receiving from the omnidirectional multi-2D-panel video stream provider system, in response to predicting the change of the FoV of the viewer, modified omnidirectional multi-2D-panel video stream data;
   a means for rendering the modified omnidirectional multi-2D-panel video stream data;
   a means for presenting the modified omnidirectional multi-2D-panel video stream data on the display.

* * * * *